US009108573B2

(12) United States Patent
Bögelein et al.

(10) Patent No.: US 9,108,573 B2
(45) Date of Patent: Aug. 18, 2015

(54) ADJUSTMENT DEVICE FOR A PIVOTABLE CARRIER PLATE

(75) Inventors: Joseph Bögelein, Sachsen bei Ansbach (DE); Gisela Fuchs, Rosstal (DE); Jürgen Heinz, Schillingsfürst (DE); Axel Vogelhuber, Sachsen bei Ansbach (DE); Winfried Schmidt, Wassertrüdingen (DE); Marco Wacker, Wilhermsdorf (DE); Martin Ruttor, Weidenbach (DE)

(73) Assignee: OECHSLER AKTIENGESELLSCHAFT, Ansbach (DE)

( * ) Notice: Subject to any disclaimer, the term of this patent is extended or adjusted under 35 U.S.C. 154(b) by 141 days.

(21) Appl. No.: 14/117,245

(22) PCT Filed: May 10, 2012

(86) PCT No.: PCT/EP2012/002003
§ 371 (c)(1),
(2), (4) Date: Dec. 9, 2013

(87) PCT Pub. No.: WO2012/156044
PCT Pub. Date: Nov. 22, 2012

(65) Prior Publication Data

US 2015/0129738 A1 May 14, 2015

(30) Foreign Application Priority Data

May 14, 2011 (DE) ........................ 10 2011 101 534

(51) Int. Cl.
*G02B 5/22* (2006.01)
*B60R 1/072* (2006.01)
*F16H 25/20* (2006.01)

(52) U.S. Cl.
CPC ................ *B60R 1/072* (2013.01); *F16H 25/20* (2013.01); *F16H 2025/209* (2013.01); *F16H 2025/2037* (2013.01)

(58) Field of Classification Search
CPC ... B60R 1/072; F16H 25/20; F16H 2025/209; F16H 2025/2037
USPC .................................. 248/487; 359/871–876
See application file for complete search history.

(56) References Cited

U.S. PATENT DOCUMENTS

| | | | | |
|---|---|---|---|---|
| 4,693,571 A * | 9/1987 | Kimura et al. | ................ | 359/874 |
| 4,770,522 A * | 9/1988 | Alten | ........................... | 359/873 |

(Continued)

FOREIGN PATENT DOCUMENTS

| | | |
|---|---|---|
| DE | 38 04 137 C2 | 8/1989 |
| DE | 39 13 776 A1 | 10/1990 |

(Continued)

OTHER PUBLICATIONS

Notification of Transmittal of Translation of the International Preliminary Report on Patentability (PCT/IB/338), International Preliminary Report on Patentability (PCT/IB/373), Written Opinion of the International Search Authority (PCT/ISA/237) mailed in corresponding Int'l Patent Application No. PCT/EP2012/002003, Nov. 28, 2013, IB of WIPO, Geneva, Switzerland.

(Continued)

*Primary Examiner* — Mark Wendell
(74) *Attorney, Agent, or Firm* — Buchanan Ingersoll & Rooney PC

(57) ABSTRACT

An adjustment device for a carrier plate which can be pivoted about two mutually orthogonal axes and is configured to receive a motor vehicle mirror, includes one motor per axis for moving a non-rotatably and non-tiltably guided linear drive, which is in engagement via a socket with a joint ball on the carrier plate, and a funnel-shaped hub provided with a hollow shaft. A hollow spherical segment of the funnel-shaped hub engages, by spring tabs, in a depression in the form of a hollow spherical segment in the carrier plate, and a spherical segment of the carrier plate is axially elastically clamped in a hollow spherical segment of a housing for drive trains of the two linear drives, thereby locking the hollow shaft on the housing.

14 Claims, 3 Drawing Sheets

(56) References Cited

U.S. PATENT DOCUMENTS

Figure 1:
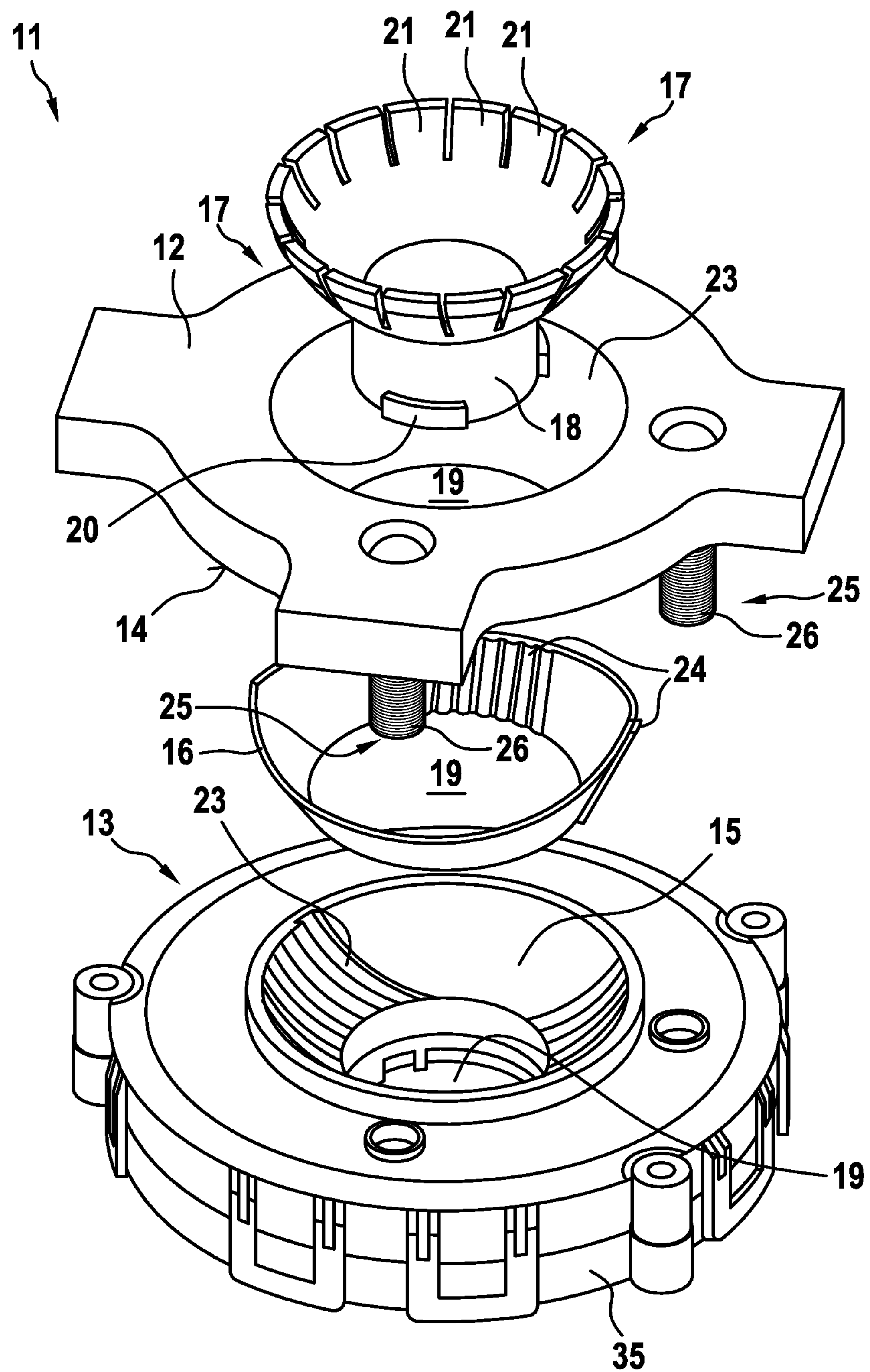

| | | | | |
|---|---|---|---|---|
| 4,915,493 | A * | 4/1990 | Fisher et al. | 359/874 |
| 5,546,240 | A * | 8/1996 | Perry et al. | 359/871 |
| 5,900,999 | A * | 5/1999 | Huizenga et al. | 359/877 |
| 5,938,166 | A | 8/1999 | Seichter et al. | |
| 6,213,612 | B1 * | 4/2001 | Schnell et al. | 359/877 |
| 6,244,714 | B1 | 6/2001 | Mertens | |
| 6,364,496 | B1 * | 4/2002 | Boddy et al. | 359/877 |
| 6,764,189 | B2 * | 7/2004 | Wolf et al. | 359/876 |
| 2002/0149865 | A1 | 10/2002 | Ishigami | |
| 2003/0123166 | A1 | 7/2003 | Wolf et al. | |
| 2004/0021965 | A1 | 2/2004 | Wolf et al. | |
| 2004/0047054 | A1 * | 3/2004 | Kikuchi | 359/877 |
| 2005/0128612 | A1 * | 6/2005 | Ro | 359/879 |
| 2012/0275044 | A1 * | 11/2012 | Caballero Tapia | 359/872 |

FOREIGN PATENT DOCUMENTS

| | | | |
|---|---|---|---|
| DE | 196 44 824 | C1 | 12/1997 |
| DE | 199 12 685 | A1 | 9/1999 |
| DE | 198 44 269 | A1 | 4/2000 |
| DE | 101 61 975 | A1 | 7/2003 |
| EP | 1 283 787 | B1 | 1/2004 |
| WO | WO 01/79029 | A1 | 10/2001 |

OTHER PUBLICATIONS

International Search Report (PCT/ISA/210) mailed on Oct. 2, 2012, by the European Patent Office as the International Searching Authority for International Application No. PCT/EP2012/002003.

* cited by examiner 11
12
13
14
15
16
17
18
20
21
23
26
27
28
29
32
33
34
35
36
37
38
39
40
41
42
43
44
45
46
47
48

ADJUSTMENT DEVICE FOR A PIVOTABLE CARRIER PLATE

The invention relates to an adjustment device in accordance with the preamble of the main claim. An adjustment device of this kind for a motor vehicle rear view mirror is known from DE 39 13 776 A1. Respective geared motors for tilting a mirror carrier plate about two mutually orthogonal axes by means of respective spindles, each of which is provided with non-rotatable longitudinal guidance in longitudinal grooves at the circumferential surface, are provided in a drive housing. The bottom of the groove is in each case profiled as an axially parallel rack, in which a pinion for turning a potentiometer wiper serving as a pivoting position sensor engages. The carrier plate is mounted movably on the top surface of the drive housing by means of a universal joint, this being achieved by mounting two mutually aligned short half shafts on the top surface in such a way as to be rotatable about their axes and correspondingly mounting two half shafts aligned orthogonally thereto under the carrier plate. With an axial offset relative to these half shafts, the spindle ends engage by means of respective joint balls in sliding blocks, which are mounted as an extension of the half shafts under the carrier plate. However, despite the quite high overall construction, the geometry of this universal joint application of the carrier plate, which can be pivoted on the drive housing, the latter being, in contrast, stationary, results in only very limited pivoting angles combined with mediocre central guidance of the pivoting movements and an almost complete lack of shock damping for the carrier plate supported by means of the two intersecting shafts; and furthermore in a considerable effort for mounting and adjusting the carrier plate.

Admittedly, the drive housing in DE 1 01 61 975 A1, which is in the form of a flat truncated cone toward the carrier plate, would per se permit a larger pivoting angle of the carrier plate—which in this case engages under spring load in a concave hollow hemisphere in the drive housing by means of a convex hollow hemisphere via a slot and key cup; however, the useful pivoting angle is then limited by the spindles, which are guided non-pivotably in the housing and which engage at the rear in the carrier plate by means of joint balls.

According to DE 1 99 12 685 A1, in contrast, use is made of a pivotable mounting of the spindle nut in order to be able to pivot the spindle, which is held between the carrier plate and the spindle nut, relative to the housing in accordance with the instantaneous inclination of the mirror carrier plate. For this purpose, the spindle is secured non-rotatably but pivotably under the carrier plate by means of its upper end. The spindle nut rests rotatably and pivotably in the housing bottom. However, it is not possible by this means to achieve the vibration-resistant setting of the slope of the mirror plate which is desirable in practice—taking into account also that the central spherical-shell mounting of the carrier plate has only a comparatively very small diameter. It is also particularly problematic that the spindle nut, which is in mesh with a geared motor, is supposed to be held in the housing of the adjustment device in such a way that it latches in a tension-resistant manner and is simultaneously pivotable in order, on the one hand, not to be pulled out of said mounting when, for instance, an external load is applied to the mirror and, on the other hand, to avoid bending stresses on the spindle, said stresses being dependent on the slope of the mirror. However, owing to the lack of load-absorbing undercuts, a tension-resistant latching connection to the plastic housing for the pivotable mounting of the spindle nut creates very considerable problems in terms of injection molding, these being discussed extensively in said prior publication but obviously not being solved satisfactorily; at any rate, this pivoting mirror design has obviously been abandoned in the meantime.

Pivoting-angle-dependent tilting of the spindle is also absorbed by the spindle nut according to DE 93 09 921 U1, for which purpose said spindle nut is tiltably mounted; however, this likewise does not permit large pivoting angles because the reliability of the gear meshing is thereby impaired. The spindle joint ball is provided with an encircling equatorial groove into which a joint socket made of rubber-elastic plastic can engage, cf. DE 38 04 137 C2.

In the design according to DE 1 98 44 269 B4, an adjusting plate is specially inserted between the mutually parallel planes of the carrier plate and the drive housing; and, between the adjusting plate and the drive housing, there is a ball joint of small size in relation to the diameters thereof, although this joint has a considerable contributory influence on the overall height of the adjustment device owing to the otherwise clear spacing. Leads to the carrier plate pass out of the drive housing through a tubular stub, by means of which the drive housing projects through the ball joint. It is not clear from the illustration in the drawing how the carrier plate can be moved out of the drive housing, nor is it disclosed in any other way.

Recognizing the facts described, the technical problem underlying the present invention is to design an adjustment device of the type in question for uncomplicated manufacture by injection molding and for simple assembly to give a mechanically stable and vibration-resistant structure and as far as possible also to make available options for different equipment levels and additional usage scenarios.

This object is achieved according to the essential features specified in the main claim. According to these, a rack-type or spindle-type linear drive is provided with non-pivotable axial support on the housing in each pivoting direction of the carrier plate, while nevertheless avoiding bending stress. This can be achieved for each pivoting axis without injection molding and assembly problems because the linear drive is connected pivotably to the carrier plate by means of a joint ball behind the carrier plate, which joint ball can be displaced parallel to said plate. At the upper end of the linear drive, a headpiece socket opened up and lengthened into a short blind tube like a U in longitudinal section reaches around a joint ball fixed on the plate (or, alternatively, vice versa), the U axis of said socket pointing in the direction of the point of intersection of the two mutually orthogonal pivoting axes of the carrier plate.

A rack or a spindle, in particular, are suitable as linear drives.

A rack with a noncircular cross section can have non-rotatable longitudinal guidance.

In the case of a spindle/nut thread pair, the spindle headpiece expediently engages in a manner fixed against relative rotation, by means of the abovementioned U-shaped socket, in a recess preferably formed on the rear side of the carrier plate to give mounting of the spindle on the carrier plate in a manner fixed against relative rotation. The spindle nut, which is supported axially by means of its two ends in the gear housing of the adjustment device, expediently rests in a rotatable but non-pivotable manner, by means of a lower sleeve, in a cup-shaped end shield fixed on the housing.

In the interests, on the one hand, of stable mounting and, on the other hand, of large-area friction (to damp any vibrations), the carrier plate engages by means of a spherical segment of relatively large outside diameter in a hollow spherical segment of virtually identical inside diameter, which is recessed into the housing. Although a smaller sphere diameter would have the advantage of better-defined support for pivoting, it would have the disadvantage of smaller friction surfaces and supporting moments. The spherical-surface mounting of the carrier plate on the housing is clamped together in an axially elastic manner by means of a funnel-shaped hub, preferably with the interposition of a friction ring for the purpose of increasing the static friction between the housing and the carrier plate. Fastening means, for example, for mounting the adjustment device by means of the rear-facing bottom on a device carrier, can be passed through the hollow central hub, or leads of electric circuits on the rear side or in the bottom of the housing can be passed through said hub to lighting or heating devices on the front side of the carrier plate, for example.

However, the decisive factor is that, according to the invention, in the case of an adjustment device for a carrier plate which can be pivoted about two mutually orthogonal axes, in particular a carrier plate for receiving a motor vehicle mirror, a linear drive in the form of a pinion-driven rack or in the form of a nut-driven spindle per axis engages on the carrier plate. In this case, a joint ball engages in an opening of a joint socket, said opening being extended in the form of a tube parallel to the carrier plate, in order to move slightly therein parallel to the carrier plate depending on the slope of the carrier plate and thereby reliably avoided bending stresses on the linear drive.

Figure 2:
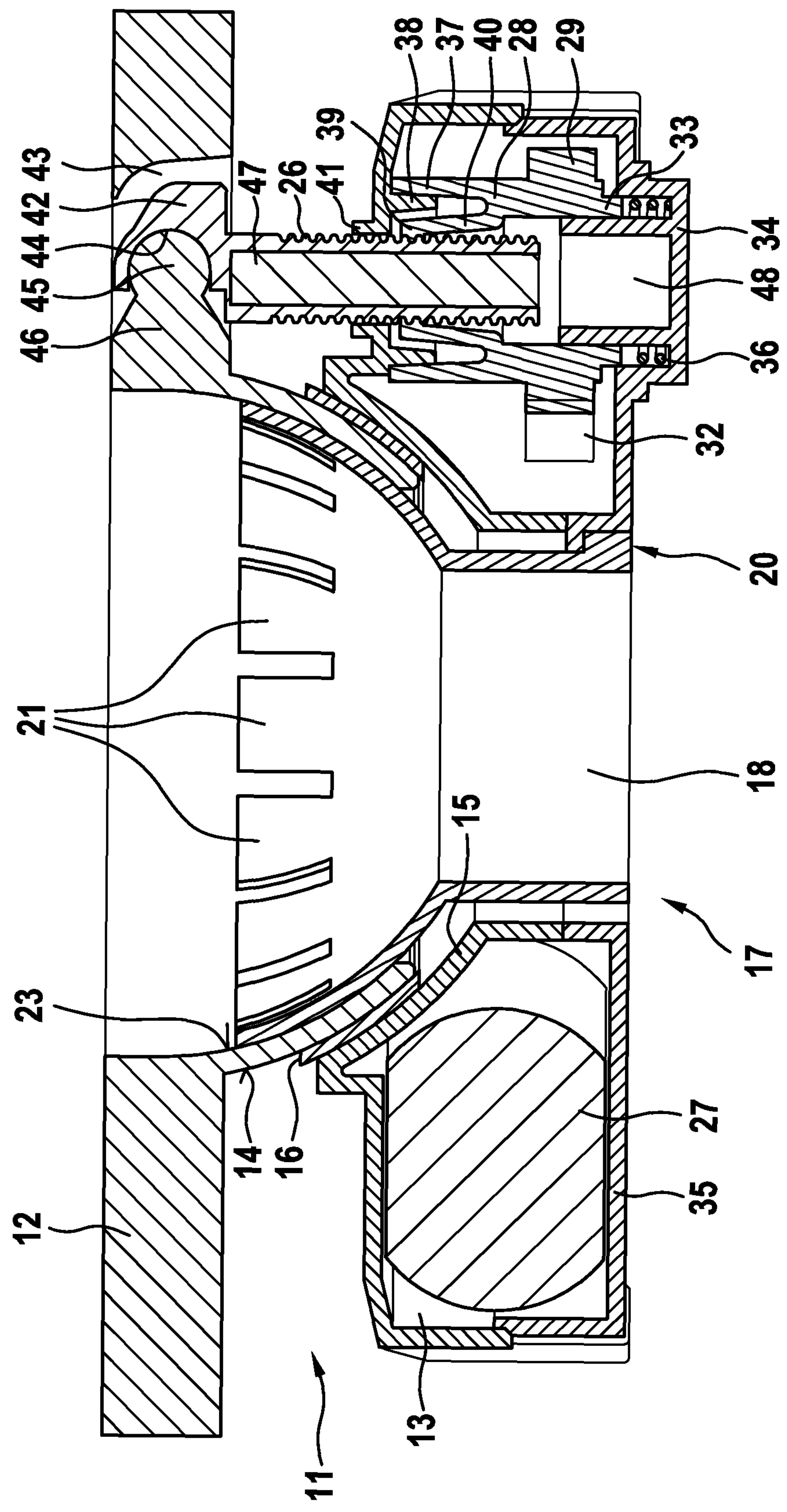
Figure 3:
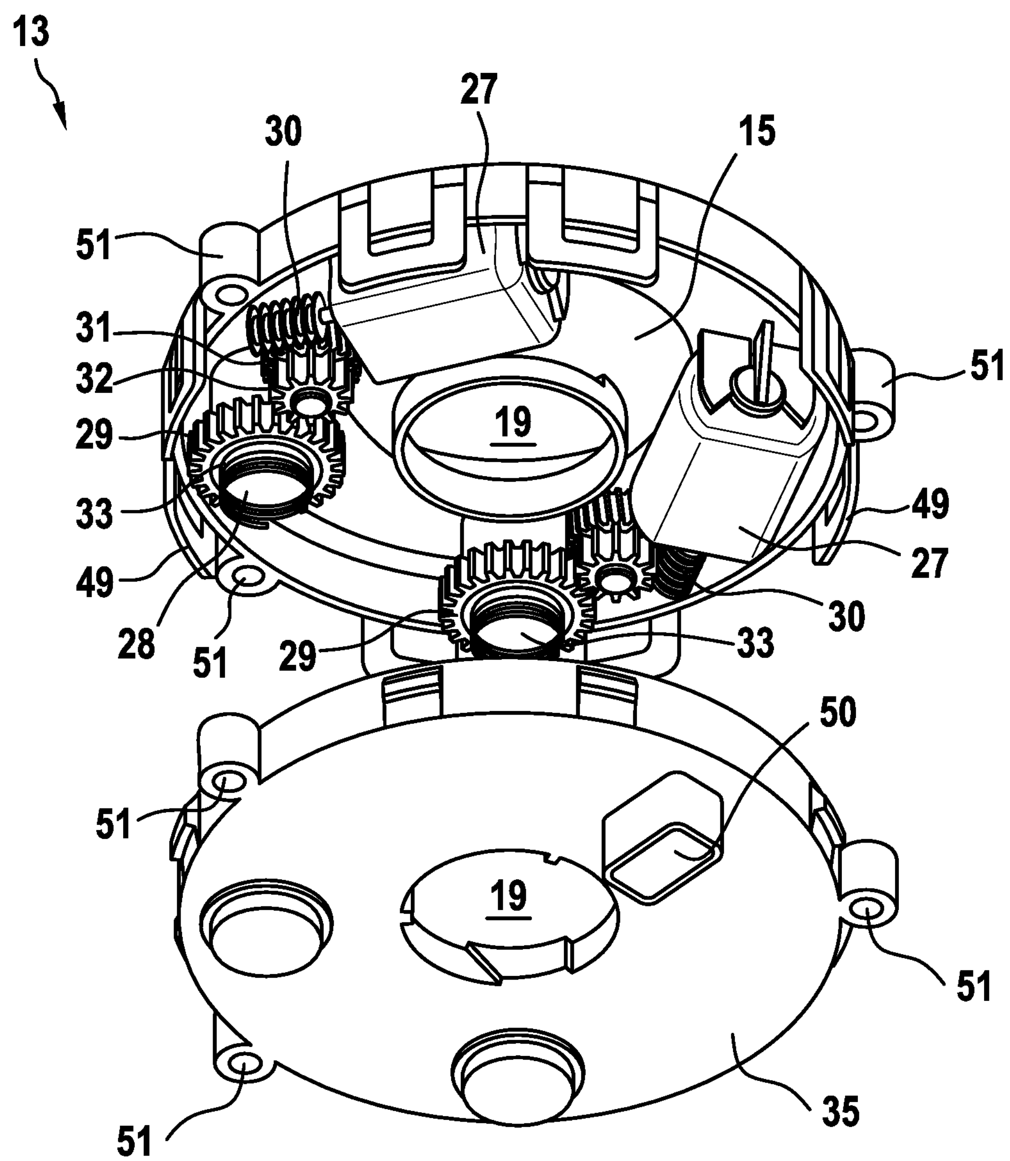

Additional alternatives to and expedient developments of the solution according to the invention will become apparent from the other claims and, while also taking into account the advantages thereof, from the following description of a preferred implementation of the solution according to the invention. The diagrams in the drawing, which are simplified to what is functionally essential while remaining approximately to scale, take a spindle/nut pair as an example of a linear drive and, in FIG. 1 show the mounting of the carrier plate on the housing in an exploded view, FIG. 2 show the carrier plate mounted ready for operation, partially in axial longitudinal section, and FIG. 3 show the drive trains of the two geared motors in the opened housing, in this case being intended for rotating spindle nuts.

The adjustment device 11 shown in the diagrams has two linear drives 25 for three dimensional pivoting of a carrier plate 12. The fastening devices thereof, in particular those for receiving a mirror, are not shown.

The carrier plate 12 is mounted pivotably on a housing 13 with an axial clearance relative to the housing 13 for the drive gear train of the two linear drives 25. For this purpose, a central spherical segment 14 fixed on the carrier plate engages in a hollow spherical segment 15, which is recessed into the top surface of the housing 13. The corresponding spherical surfaces are clamped together axially, with the interposition of a friction ring 16 in the form of a segment of the wall of a hollow sphere to increase the vibration-damping static friction. For this purpose, use is made of a funnel-like hub 17, the short hollow shaft 18 of which projects through coaxial pole openings 19 in the spherical segments 14, 15 and 16 and through the housing 13 and is fixed on the latter in the region of the housing bottom, e.g. by means of a non-releasable bayonet-type means of locking 20 (see also FIG. 2). Opposite the latter, the funnel-shaped hollow shaft 18 ends, in an axial region of overlap with the friction ring 16, with a hollow stub 22 formed by radially acting, single-armed spring tabs 21 in the manner of a segment of the wall of a hollow sphere. Said hollow stub rests with centrifugal spring elasticity against the inner wall—likewise in the form of a hollow sphere—of a depression 23 situated in the front face of the carrier plate 12, said front face being situated on the visible side or fitting side. The depression 23 likewise has a pole opening 19 for the passage of the hub/hollow shaft 18.

The spring tabs 21 of the hub opening in the form of an arched funnel can be produced by injection molding, integrally with the rest of the hub 17 as indicated diagrammatically. However, depending on the actual requirements on the friction forces on both sides of the friction ring 16 for jerk-free changing, on the one hand, and for vibration-resistant maintenance of the mirror-plate pivoting position, on the other, it is also possible within the scope of the present invention to make provision to accommodate metal spring tabs 21 in the hub 17 injection-molded in the form of a funnel, said tabs being overmolded or specially fitted for instance. At any rate, the carrier plate 12 is mounted pivotably on the hollow spherical segment 15, with its segment in the form of the wall of a hollow sphere (consisting of spherical segment 14 and depression 23) being clamped axially in a spring-elastic manner between the spring-elastic hollow stub 22, on the one hand, and the friction ring 16, on the other.

The carrier plate 12 is to be pivotable in just two mutually orthogonal directions. For this purpose, as indicated in the diagram in the drawing, there are respective groups of mutually parallel, groove-shaped depressions 23 introduced into the outer circumferential surface of the carrier-side spherical segment 14 and into the inner circumferential surface of the housing-side hollow spherical segment 15, running transversely at right angles to one another; and corresponding shallow guide ribs 24 are embossed on the inner and outer circumferential surfaces of the friction ring 16 to provide it with slot and key guidance on both sides. At least one of the ribs 24 is wider and/or higher than the others, with a corresponding special depression 23, in order to ensure the correct azimuthal positioning of the carrier plate 12 relative to the housing 13 without problems when assembling the adjustment device 11.

To perform defined pivoting movements, the two linear drives 25 engage behind the carrier plate 12, namely each with an offset transversely to their pivoting axis, which passes through the point of intersection of the two pivoting axes and hence through the center of the abovementioned hollow sphere mounting.

In the illustrative embodiment depicted, these linear drives 25 each have—instead of respective longitudinally guided racks fixed against relative rotation and having a motor-operated spur-type pinion drive—a spindle 26 which is articulated in a manner fixed against relative rotation on the rear of the carrier plate 12 and which extends into the housing 13 parallel to the system axis of the adjustment device 11, which passes through said center. In this, the spindle thread is engaged by the thread 39 of a nut 28 which can be rotated via a transmission chain by a motor 27 mounted by latching in the housing 13.

A gear ring 29 is formed integrally with the nut 28 or connected for conjoint rotation therewith, being offset axially with respect to the limited axle section of the nut thread 39, with a radial clearance with respect to the thread of the spindle 26. A rotary motion is impressed upon the nut 28 by the motor 27 via a spur gear and a worm gear arranged ahead of the latter. For this purpose, said motor is fitted on the output shaft thereof with a worm 30 which is in engagement with the worm wheel 31 of a double gearwheel, which drives the nut 28 via a spur-toothed pinion 32 and the spur-toothed gear ring 29.

On the other side of its gear ring 29, the nut 28 projects at the bottom, by means of a sleeve 33, into a cup-shaped end shield 34, which, as depicted, is part of a bottom 35 that can be removed from the housing 13 or which is, for instance, inserted into the bottom 35. Here, the nut 28 can be supported rigidly in the end shield 34 in the axial direction; or it is supported against the end shield 34 by a compression spring 36 to compensate axial play. As depicted, said compression spring can be a helical spring used here, or spring arm elements are formed directly on the nut 28 for this purpose. At the axially opposite end, the nut 28 is provided with a collar 37, which encircles it at a radial distance and the free end rim of which supports the spindle nut 28 axially against the underside of the top region of the housing 13. In this case, the nut 28 is guided radially along a rib 38, over which the collar 37 fits radially and which extends around the axis of the spindle 26 in a manner fixed in relation to the housing.

The nut 28 is slotted axially along the axial extent of the thread 39 thereof and downward beyond the latter, with the result that sectors of the thread 39 are situated at the free ends of radially acting bending springs 40 within the encircling rib 38. As a result, said rib engages axially from above in the nut 28, between the collar 37 and the thread 39. Moving thread segments to the free ends of bending springs 40 makes possible manual adjustment of the carrier plate 12 since, when force is exerted manually on a linear drive 25, the nut thread 39, which gives way radially with its bending spring 40, temporarily moves out of engagement with the spindle thread; this can be further promoted by means of the geometry of the toothing.

In principle, two or three bending springs 40 with segments of nut thread 39 are sufficient for the linear drive 25. The bending springs 40 can consist of steel sheet with embossed threaded portions and can furthermore be molded or fitted into the nut 28; or plastic bending springs 40 of this kind molded integrally with the remainder of the nut 28 can be enclosed in the region of the segments of the nut thread 39 in order to stabilize a spring ring that can be expanded radially when the thread engagement is temporarily disengaged (not shown).

For coupling to the carrier plate 12, the respective linear drive 25 in the depicted example of a spindle 26 projects non-pivotably out of the top of the housing 13, being guided radially by a short stub 41 in the top region of said housing, and enters a rear recess 43 on the carrier plate 12 by means of a ball joint headpiece 42 arranged in a manner fixed against relative rotation on its free end. Owing to the reception of its headpiece 42 there in a manner fixed against relative rotation, the spindle 26 is arranged in a manner fixed against rotation relative to the spindle nut 28, which can be rotated by a motor.

The headpiece 42 of the linear drive 25 is provided with a socket 44 in the form of a hollow hemisphere, which is open in the direction of the point of intersection of the two pivoting axes and is extended slightly to give a short (blind) tube of U-shaped longitudinal section. A joint ball 45 (hemispherical as depicted here) is held in front of a stem 46 fixed on the carrier plate, which is oriented counter to the direction of said U-shaped opening. Depending on the instantaneous slope of the carrier plate 12, the joint ball 45 can shift longitudinally to a slight extent in the short U-shaped tubular guide, with minimal rotation about its ball axis, transversely to the stem 46. Bending stresses on the linear drive 25 in the form of the rack or the spindle 26—and therefore also expansion stresses on the nut thread 39—during the tilting of the carrier plate 12 are thereby reliably avoided, this being achieved despite the non-tiltable mounting of that of the linear drive 25, that is to say, for instance, of the spindle nut 28 in the end shield 34 of the housing bottom 35 with axial support of the spindle nut 28 at the other end against the top region of the housing 13.

Because of the purely axial stress on the linear drive 25, said linear drive, that is to say, for instance, the spindle 26, can be provided with a tough core 47, which then need only be enclosed by a relatively thin jacket by means of the external thread of the spindle. In addition to guidance in the top stub 41, the lower end of the spindle 26, that situated in the housing 13, can also be provided with linear guidance through entry into a hollow cylinder 48 to a greater or lesser depth, depending on the slope of the carrier plate 12.

The possibility of mechanically connecting a, possibly angled, arm to the spindle 26 in order additionally to provide rotary or linear adjustment of a measurement potentiometer accommodated in or on the housing 13 according to the entry of said spindle into the housing 13, i.e. according to the instantaneous angular position of the carrier plate 12, is not taken into account in the drawing.

Likewise not taken into account in the drawing is the fact that the leads, in particular leads connected for low voltage electric control of the motors 27, expediently run in or on the bottom 35, which can be removed like a cover from the housing 13, in particular are molded into the bottom 35 as metallic pressed-screen or wire conductors or are made of electrically conductive plastic and encapsulated by the bottom 35 in a multicomponent injection molding process.

By means of integrally formed clips 49, the housing 13 fitted with the motors 27 and gears is closed with a latching action by means of the cover-shaped bottom 35. During this process, contact can be made between the conductors on or in the bottom 35 and, in particular, the motors 27 in the housing 13 via contact tabs, which project from the encapsulated conductors in the bottom 35, for instance, and protrude upward into the housing 13.

Electrical connection of, for example, lighting or heating means in the external area of the carrier plate can be made from the inside of the cover-shaped bottom 35 by passing leads through the hollow hub 18. Depending on spatial conditions in the housing 13, it is possible to connect RC or LC-EMC filters to the conductors on the inside or outside of the bottom 35, close to the motors 27, which generates electromagnetic interference, and this may even be done retrospectively; for this purpose, the encapsulation of the conductors is expediently prepared, being exposed locally in connection areas to allow the subsequent connection of components. Apart from this, it is advantageous to form a central plug cage 50 externally on the underside of the bottom cover 35, said cage being connected to the conductors. Instead or in addition, it is also possible for pre-stamped holes to be provided in the bottom 35, through which plug pins can be connected directly to the conductors running in or in front of the cover 35 or even directly to the motors 27, this taking place on the rear side and in each case preferably involving tearing open a molded sealing skin.

Hollow lugs 51, which are molded onto the side of the housing 13 and, if required by the design, are offset peripherally relative to the integrally molded clips 49, and which are split in the plane of the removable bottom 35, are used to fasten the adjustment device 11, with axial clamping, on a device carrier (not shown; e.g. a hinged arm on the vehicle body) while simultaneously ensuring that the bottom 35 is held together axially with the rest of the housing 13.

Thus, according to the invention, a vibration-resistant adjustment device 11, which can be actuated both by electric motor and manually and is intended for a carrier plate 12, in particular a carrier plate for holding a motor vehicle mirror, that can be pivoted about two mutually orthogonal axes has, under the carrier plate 12, a spherical segment 14 which rests with the interposition of a profiled friction ring 16 in a hollow spherical segment 15 in the surface of a housing 13 for accommodating one geared motor 27 for each pivoting axis.

Each motor 27 moves a linear drive 25, e.g. in the form of a rack guided in a non-rotatable and non-tiltable manner in the housing 13 or in the form of a spindle nut 28 clamped axially in a non-tiltable manner in the housing 13. As a result, said rack or nut moves the spindle 26 of the linear drive 25, which spindle is likewise guided in a non-tiltable manner in the housing 13 and is articulated eccentrically and in a manner fixed against relative rotation on the underside of the carrier plate 12. In this articulated joint, a joint ball 45 engages in an opening, extended in the form of a tube, in a joint socket 44 so as to shift slightly therein, depending on the slope of the carrier plate 12, ensuring that there are no bending moments on the shaft of the linear drive 25. The bottom 35, which can be mounted like a cover under the drive housing 13, carries the electrical wiring, to which EMC filters can be connected inside or outside the bottom 35, close to any motors 27 generating interference, this even being possible retrospectively. Cabling from the bottom 35 to the top side of the carrier plate 12 can be passed through a hollow hub 17, which axially clamps the adjacent nested circumferential surfaces of the spheres against the friction ring 16 inserted between them—with its assembly alignment and orthogonal pivoting guidance function—by means of a hollow sphere comprising or having spring tabs 21, which is located on one end of a hollow shaft 18 passing through sphere pole openings 19 and engages in the carrier plate 12, and by means of a means of locking 20 on the other end of said hollow shaft.

LIST OF REFERENCE SIGNS

11 adjustment device (consisting of 12 and 13)
12 carrier plate (in particular for a mirror)
13 housing (with mounting for 12)
14 spherical segment (under 12)
15 hollow spherical segment (in 13)
16 friction ring (between 14 and 15)
17 hub (through 12 and 13)
18 hollow shaft (of 17)
19 pole openings (in 14, 15, 16, 23; for the passage of 18)
20 means of locking (of 17 in 13)
21 spring tabs (on 18 in 23)
22 hollow stub (of 17, under 21)
23 depression (in 12-14)
24 guide ribs (in 16)
25 linear drives (between 12 and 16)
26 spindle (as an example of 25)
27 motor (for 25)
28 nut (on 26)
29 gear ring (on 28)
30 worm (on 27)
31 worm wheel (between 30 and 32)
32 pinion (in front of 29)
33 sleeve (on the bottom of 28)
34 end shield (in 35 for 28)
35 bottom (of 13, with 34)
36 compression spring (between 34 and 28)
37 collar (at the top of 38)
38 rib (in 13, engaging between 37 and 40)
39 thread (in 28)
40 bending spring (on 28 with 39)
41 stub (in 13 for radial guidance of 26)
42 headpiece (on 26, in 12)
43 recess (in 12 for 26 and 45)
44 socket (in 42 for 45)
45 joint ball (in 43 for 44)
46 stem (in 43 for 45)
47 core (in 26)
48 hollow cylinder (at 34 for 26)
49 clip (between 35 and the rest of 13)
50 plug cage (under 35)
51 hollow lug (on 13)

The invention claimed is:

1. An adjustment device for a carrier plate which can be pivoted about two mutually orthogonal axes and is configured to receive a motor vehicle mirror, the adjustment device comprising one motor per axis for moving a non-rotatably and non-tiltably guided linear drive, which is in engagement via a socket with a joint ball on the carrier plate, and a funnel-shaped hub provided with a hollow shaft, wherein a hollow spherical segment of the funnel-shaped hub engages, by spring tabs, in a depression in the form of a hollow spherical segment in the carrier plate, and a spherical segment of the carrier plate is axially elastically clamped in a hollow spherical segment of a housing for drive trains of the two linear drives, thereby locking the hollow shaft on the housing, the respective sockets of the two linear drives extending to form respective short tubes oriented parallel to the carrier plate and in which respective joint balls, which are held in front of a stem fixed on the carrier plate, can be displaced.

2. The adjustment device as claimed in claim 1, wherein the spring tabs are metal spring tabs mounted on the hub or molded into the hub.

3. The adjustment device as claimed in claim 1, wherein the hollow shaft of the hub passes through pole openings in the spherical segments.

4. The adjustment device as claimed in claim 1, wherein each linear drive engages in a recess in the carrier plate.

5. The adjustment device as claimed in claim 1, wherein each linear drive is a pinion-driven rack.

6. The adjustment device as claimed in claim 1, wherein each linear drive is a nut-driven spindle which engages on the carrier plate by a ball joint headpiece in a manner which prevents relative rotation.

7. The adjustment device as claimed in claim 6, wherein each nut is supported axially in a resilient manner, by means of the ends thereof, between the housing bottom and the housing top region and is in engagement by its thread with the spindle and engages by a sleeve in a cup-shaped end shield.

8. The adjustment device as claimed in claim 7, wherein the nut is connected for rotation to the motor by a spur gear and a worm gear.

9. The adjustment device as claimed in claim 7, wherein a rib extending around the spindle in a manner fixed in relation to the housing engages coaxially from above in the nut, between a collar, which is fixed on the nut, and bending springs, at the free ends of which segments of the nut thread are provided.

10. The adjustment device as claimed in claim 7, wherein, outside the nut, the spindle is guided radially in a manner fixed in relation to the housing.

11. The adjustment device as claimed in claim 1, wherein, with an axial clearance relative to the housing, the spherical segment provided behind the carrier plate rests pivotably, with the interposition of a friction ring in the form of a segment of the wall of a hollow sphere, in the hollow spherical segment fixed on the housing.

12. The adjustment device as claimed in claim 11, wherein the friction ring engages by guide ribs in groove-shaped depressions which are provided in the hollow spherical segment fixed on the housing and are provided transversely thereto on the spherical segment fixed on the carrier plate.

13. The adjustment device as claimed in claim 12, wherein at least one of the guide ribs together with the corresponding depression is higher and/or wider than the others.

14. The adjustment device as claimed in claim 1, wherein hollow lugs are molded onto the side of the housing and are split in the plane of the removable bottom thereof.

* * * * *